United States Patent
Belsoeur et al.

(10) Patent No.: US 12,307,834 B2
(45) Date of Patent: May 20, 2025

(54) ASSISTED VEHICLE IDENTIFICATION METHOD AND DEVICE

(71) Applicant: DELPHI TECHNOLOGIES IP LIMITED, St. Michael (BB)

(72) Inventors: Stéphane Belsoeur, Cléré-les-Pins (FR); Fabrice Gautrey, Rochecordon (FR)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 50 days.

(21) Appl. No.: 18/035,820

(22) PCT Filed: Nov. 8, 2021

(86) PCT No.: PCT/EP2021/080945
§ 371 (c)(1),
(2) Date: May 8, 2023

(87) PCT Pub. No.: WO2022/096711
PCT Pub. Date: May 12, 2022

(65) Prior Publication Data
US 2023/0401910 A1   Dec. 14, 2023

(30) Foreign Application Priority Data
Nov. 9, 2020  (GB) ..................... 2017659

(51) Int. Cl.
*G07C 5/08*   (2006.01)
*G07C 5/00*   (2006.01)

(52) U.S. Cl.
CPC ........... *G07C 5/0808* (2013.01); *G07C 5/008* (2013.01); *G07C 2205/02* (2013.01)

(58) Field of Classification Search
CPC .. G07C 5/0808; G07C 5/008; G07C 2205/02; G07C 5/00; H04L 67/12
See application file for complete search history.

(56) References Cited

U.S. PATENT DOCUMENTS 9,300,414 B1 *  3/2016  Daniel ................... H04H 60/65
9,911,151 B1 *  3/2018  Gordon .............. G06Q 30/0643
(Continued)

FOREIGN PATENT DOCUMENTS

WO   2018112646 A1   6/2018
WO   2018197920 A1   11/2018

OTHER PUBLICATIONS

International Search Report for PCT/EP2021/080945 dated Feb. 9, 2022, 2 pages.

*Primary Examiner* — Curtis J King
(74) *Attorney, Agent, or Firm* — Warner Norcross + Judd LLP (57) ABSTRACT

A process of identifying a model and/or platform and/or brand of a vehicle comprises:
connecting a vehicle identification device, having at least one vehicle communication interface, on at least one OBD plug of an OBD line of a tested vehicle, the vehicle identification device being associated with a database of stored communication patterns corresponding to a list of models and/or platforms and/or brands of vehicles,
listening to communication on OBD line to detect data frames emitted by or between systems of the tested vehicle on the communication line,
extracting messages of the tested vehicle from the data frames,
comparing the messages of the tested vehicle with stored messages within stored communication patterns in the database to identify messages of the vehicle corresponding to messages of the stored communication patterns, and,
providing identification data of model and/or platform and/or brand of the tested vehicle.

13 Claims, 6 Drawing Sheets

(56) References Cited

U.S. PATENT DOCUMENTS

| | | | |
|---|---|---|---|
| 11,571,936 B1* | 2/2023 | Del Olmo | B60C 23/0496 |
| 2012/0065834 A1* | 3/2012 | Senart | G08G 1/0962 |
| | | | 701/31.4 |
| 2014/0195100 A1* | 7/2014 | Lundsgaard | G07C 5/008 |
| | | | 701/29.6 |
| 2015/0371457 A1 | 12/2015 | Bakfan et al. | |
| 2020/0058210 A1* | 2/2020 | Williams | G08B 21/22 |
| 2020/0307621 A1* | 10/2020 | Ostrowski | G07C 5/008 |
| 2020/0348129 A1* | 11/2020 | DeBoer | G01B 11/275 |
| 2022/0027823 A1* | 1/2022 | Singh | G06Q 10/10 |
| 2022/0028188 A1* | 1/2022 | Singh | G07C 5/0808 |
| 2023/0377387 A1* | 11/2023 | Hayes | G06Q 40/08 |

* cited by examiner

| HEX ID | LENGTH | PERIODICITY | COUNT | GROUP | BRAND | MODEL | YEAR | VIN | KtypNr | MotNr |
|---|---|---|---|---|---|---|---|---|---|---|
| HEX1 | L1 | P1 | C1 | GR1 | BR1 | M1 | YYYY | VIN1 | xxxxx | yyyyy |
| HEX2 | L2 | P2 | C2 | GR1 | BR2 | M2 | YYYY | VIN2 | xxxxx | yyyyy |
| HEX3 | L1 | P3 | C3 | GR2 | BR3 | M3 | YYYY | VIN3 | xxxxx | yyyyy |
| HEX1 | L3 | P4 | C4 | GR2 | BR3 | M3 | YYYY | VIN4 | xxxxx | yyyyy |
| HEX4 | L4 | P5 | C5 | GR1 | BR2 | M2 | YYYY | VIN5 | xxxxx | yyyyy |
|  |  |  |  | GR1 | BR3 | M4 | YYYY | VIN6 | xxxxx | yyyyy |
|  |  |  |  |  |  |  | YYYY | VIN7 | xxxxx | yyyyy |
|  |  |  |  |  |  |  | YYYY | VIN8 | xxxxx | yyyyy |

ASSISTED VEHICLE IDENTIFICATION METHOD AND DEVICE

CROSS-REFERENCE TO RELATED APPLICATIONS

This application is the U.S. National Stage of International Application No. PCT/EP2021/080945 filed on 8 Nov. 2021, which claims priority to and all advantages of United Kingdom Application No.2017659.0 filed on 9 Nov. 2020, the contents of which are incorporated herein by reference.

FIELD OF THE INVENTION

The present invention concerns diagnostics and repairs on vehicles and aims to improve correct identification of vehicles to be diagnosed and repaired.

BACKGROUND OF THE INVENTION

In order to communicate with a vehicle network through diagnostic services e.g. with an OBD (On Board Diagnostics) diagnostic tool or telematic devices such as on-board fleet management devices or OBD dongles, it is necessary to determine/select accurately the type of the vehicle to communicate with. Historically the first OBD diagnostic tools were only proposing a manual vehicle selection by the end-user. With the almost exponential multiplication of the vehicle models and system variants, OBD tool users have been appealed by automatic identification methods in these tools and such function became an important selection factor during the purchase of a diagnostic tool.

There are multiple techniques developed by OBD diagnostic tools manufacturers to automatically identify the vehicle model and variant to which the tool is connected. They generally all bear either on partial manual vehicle selection or input made by the user or on non-standard commands sent blindly to the vehicle when the use of standard (SAE J1979 or ISO15031-5) commands is not sufficient.

In some cases, especially those for which the VIN number cannot be read through SAE J1979 or ISO15031-5 communication, it is needed for the end user to make a partial vehicle selection manually before initiating the automatic identification process.

Instead or in addition to a partial manual selection, some manufacturers of equipments connected to the OBD plug make the choice to send blindly a set of commands through the OBD port and to analyse the received responses, if any, to try to determine the vehicle model. This method has two drawbacks:
- Sending non-standard commands to a vehicle that is not designed to process these commands may lead to unexpected result such as Warning lamp or message on the dashboard, faults logged in ECU and may even cause damages to the vehicle;
- Some vehicles of different types (different brand of a same group or model or variant) may provide responses which does not allow complete identification to the same command which may lead to inaccurate vehicle selection.

With respect to telematics devices the issue is also to recognize the vehicle type before proceeding to communication or extraction of data.

SUMMARY OF THE INVENTION

The present invention is an alternative of these two techniques with less drawbacks and better performance.

Instead of actively communicating with systems over standard and/or VM specific communications lines and protocols, the principle of the invention is to passively listen to standard communication lines (e.g. as per SAE J1962/ISO15031-3) on vehicles OBD plugs to obtain information about the vehicle type.

More precisely, the present invention proposes a process of identifying a model and/or platform and/or brand of a vehicle through:
- connecting a vehicle identification device, having at least one vehicle communication interface, on at least one OBD plug of an OBD line of a tested vehicle, said vehicle identification device being associated with a first database of stored communication patterns corresponding to a list of models and/or platforms and/or brands of vehicles,
- listening to on line communication on the OBD port to detect data frames emitted by or between systems of said tested vehicle on said at least one communication line,
- extracting messages of said tested vehicle from said data frames,
- comparing said messages of said tested vehicle with stored messages within stored communication patterns in said first database to identify messages of the vehicle corresponding to messages of said stored communication patterns and,
- providing identification data of model and/or platform and/or brand of said tested vehicle when said messages of said vehicle are recognized as corresponding to a known communication pattern of at least one of said vehicles and/or platforms and/or brands of vehicles.

This process that uses passive listening as a first approach eliminates the risk to create unexpected fault on a vehicle as it does not send unexpected messages on the OBD bus.

In realization modes:

The former steps may be repeated to improve correspondence with said communication patterns in case match is found but the communication pattern is not complete.

In case no match is found between a specified number of extracted messages and messages in stored communication patterns or in case no match is found after a specified duration of listening, extracting and comparing, a process of refining vehicle identification may be initiated.

This permits to have a first selection of vehicles and refine the identification.

The process may comprise introducing a manual identification of the vehicle together with extracted message communication patterns in said first database to update said first database and reference said tested vehicle in said first database in case identification is possible.

This permits to enrich the tool with new vehicles.

In case vehicle identification is not complete or several vehicles correspond to a single pattern then the procedure of refining vehicle identification may be initiated.

This renders easier a further manual vehicle selection or even eliminate the need for manual selection.

The patterns may comprise identified messages with identifier data, data length, periodicity, and said comparing said message of said tested vehicle with stored messages within stored communication patterns in said first database may comprise comparing at least said identifier data, data length, periodicity to identify messages of the tested vehicle.

In case the vehicle identification device comprises a second database comprising query messages for receiving VIN data associated with at least a group of models and/or platforms and/or brands of vehicles of said list and said vehicle identification device comprising means for emitting said query messages on said OBD plug communication line, the process may comprise emitting said query messages for receiving VIN data for a partially identified vehicle of said group by said vehicle identification device and providing a complete identification of the model of the vehicle based on said VIN data.

This provides identification based on the VIN data without the risk of sending non-recognized messages on the OBD bus of the vehicle.

In case said vehicle identification device comprises a communication port to the internet, said providing a complete identification of the model of the vehicle based on said VIN data may comprise connecting to a VIN decoding service provider and obtaining data from said VIN decoding service provider based on said VIN number or part of said VIN number.

The first database may comprise at least for some vehicles, vehicle data comprising vehicle VIN data, manufacturer group, brand, model year, and said process may comprise processing or displaying said data of an identified vehicle by said vehicle identification device.

This provides essential information to the user.

Said first database may comprise further vehicles identification parameters such as aftersales cataloging vehicle identification number or engine type and said process may comprise using said parameters by said vehicle identification device to provide additional information for repairing the vehicle or ordering repair parts.

The invention concerns further a vehicle identification device of a computerized type comprising a vehicle communication interface on at least one OBD plug of a vehicle, a communication port to the internet, storage means for said first database and calculation means comprising software configured for carrying out the process of the invention.

In case the vehicle identification device is embedded in a diagnostic tool or linked to a diagnostic tool, such diagnostic tool may comprise further a user interface and a diagnostic module for providing diagnostics on said vehicle.

The invention concerns also a software comprising instruction for carrying out all or part of the process when such program is executed by a computerized system and a non-transitory storage media such as CD ROM, DVD ROM, USB memory stick, ROM, hard disk, SSD or any other nonvolatile memory device, readable by a computerized system on which the program is recorded.

BRIEF DESCRIPTION OF THE DRAWINGS

A detailed description of exemplary embodiments of the invention will be discussed hereunder in reference to the attached drawings where.

DETAILED DESCRIPTION OF EMBODIMENTS OF THE INVENTION

The present invention concerns an identification process for vehicles based on the detection of specific signature of the vehicle in messages exchanges over a vehicle communication network accessible through the OBD port of the vehicle.

On all modern vehicles, the systems fitted on the vehicle continuously exchange data between each other over vehicle communications networks (most commonly CAN, but other technologies are used such as LIN, flexray etc.).

The exchanged data is defined in message sets specific to a vehicle model or platform. Most of the messages defined in the message sets are sent periodically and some other messages are sent "on-event".

A message set being specific to a model or a platform, knowing the message set present on the OBD communication port of a vehicle allows deducing from it at least the brand and model or platform of this vehicle.

Figure 3:
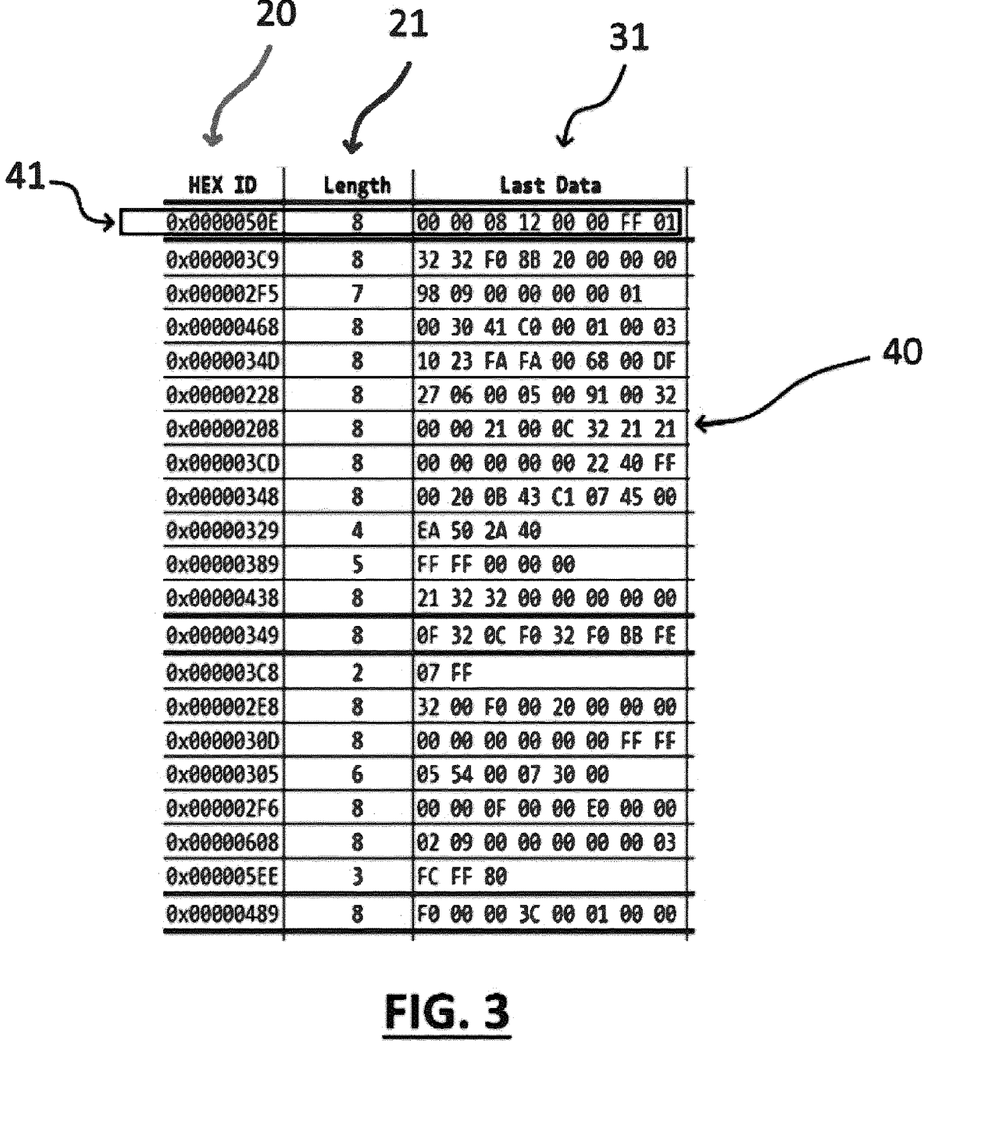
FIG. 3: is an exemplary extract of communication on a diagnostic port of a vehicle.

Vehicle networks are often accessible through the standard lines of OBD port (as per J1962/ISO15031-3), it is therefore possible to listen to the communications on these vehicle networks and get an overview of part of the message sets used by the vehicle and detect communication patterns which such as fingerprints are unique to a vehicle or group of vehicles. In FIG. 3 is an example of communication data recorded on the standard CAN OBD2 pin contacts 6 and 14 of an OBD port of a vehicle.

The structure of the data exchanged are normalized in communication protocols such as CAN protocol or others comprises a frame Id 20, a data length 21 for such frame and data 31 of the frame 41. A plurality of data frames 40 may be emitted on the bus depending on the status of the vehicle, locked, contact on, motor on, such plurality of data frames defining communication patterns.

Figure 4A:
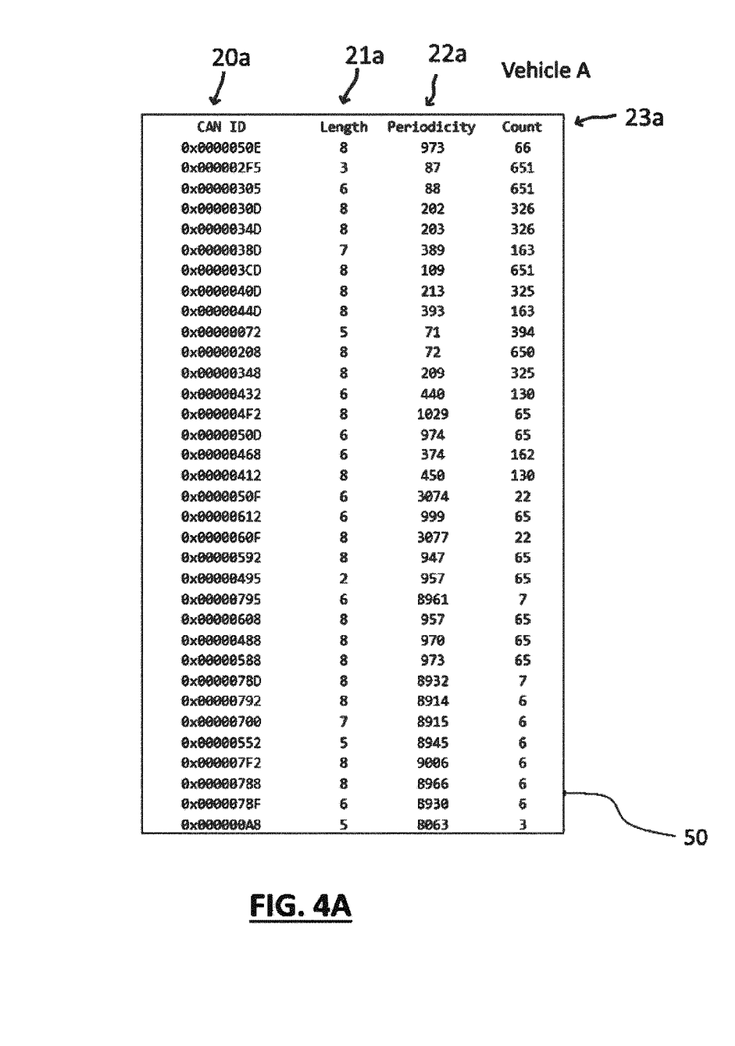
FIG. 4A: is a list of messages seen on a first vehicle diagnostic port.
Figure 4B:
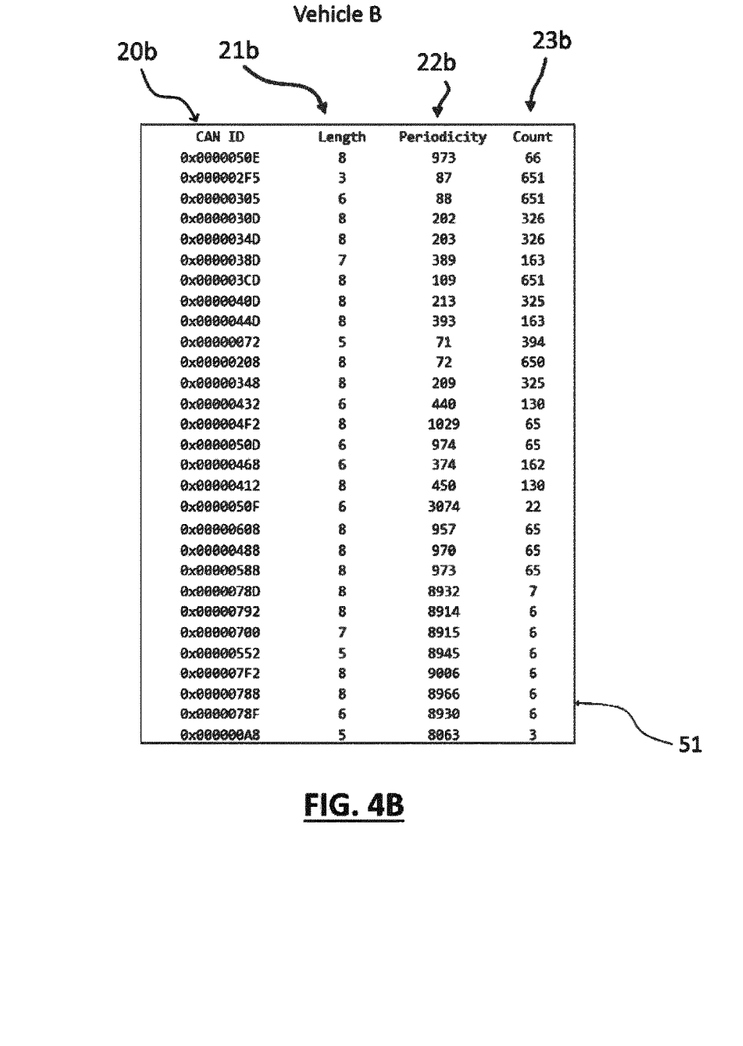
FIG. 4B: is a list of messages seen on a second vehicle diagnostic port.

FIG. 4A shows an example of communication pattern 50 comprising frames emitted for a vehicle A and FIG. 4B shows a communication pattern 51 comprising frames emitted for a vehicle B and it can be seen that IDs 20a, 20b correspond to different length 21a, 21b, periodicity 22a, 22b and count 23a, 23b in a time of record of the OBD data.

When developing OBD diagnostic applications or other applications such as vehicle parameters survey on the vehicle identification device, it is then possible to record the messages exchanged on the OBD bus of the vehicle, this providing communication patterns of vehicles which may be added to a database of stored vehicles communication patterns which can be seen as a database of "known vehicle fingerprints".

This permits to associate the vehicle identification device with a first database of stored communication patterns 50, 51, . . . corresponding to a list of models and/or platforms and/or brands of vehicles. In such database some frames may be common for several vehicles and the communication patterns are distributed within the database.

In case several vehicles share a same communication pattern, identification of the communication pattern may permit to detect at least a group of said vehicles and/or platforms and/or brands of vehicles thus providing to the user a partial identification which can be refined more easily.

Figure 5:
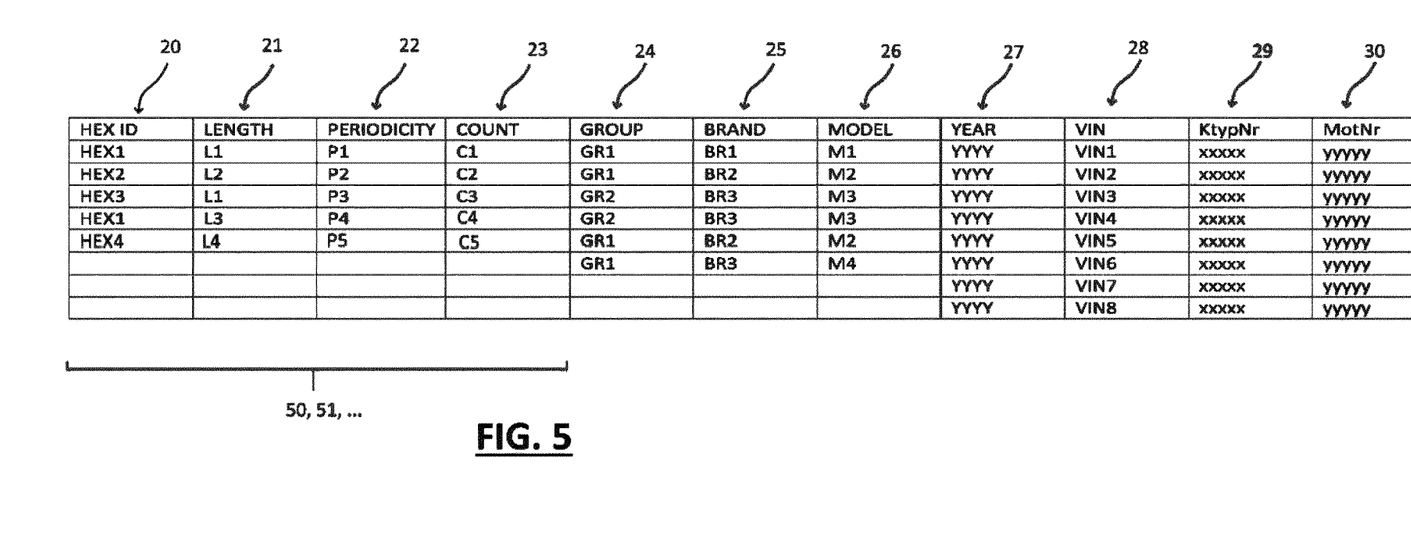
FIG. 5: is an example of data organization in a first database of communication patterns and vehicles.

As shown in FIG. 5, the first database can link data frames with vehicles. In such example, Hexadecimal Id 20 of data frames, their length 21, periodicity 22, count 23 are linked to vehicles and are recorded in the first database. The vehicles being referenced as group 24 which is the manufacturer group company, brand, the vehicle brand 25, model 26, year of manufacturing 27, vehicle identification number and if needed other identification parameters such as aftersales cataloging vehicle identification number 29 or engine type number 30.

In such first database, various messages are recorded and correspondence between vehicles and a group of messages can be obtained. As a same frame may be found in several vehicles, the identification process will need several frames to provide the pattern of frames of the vehicle to complete identification.

Therefore, when obtaining a communication pattern exchanged on the OBD bus of a vehicle under test, it is possible to compare the frames emitted by a vehicle with the communication patterns 50, 51, . . . stored in the first database or "known vehicles fingerprint database" and obtain either a unique vehicle model or a list of probable vehicle models matching this fingerprint/communication pattern.

When identification of a unique type of vehicle cannot be obtained (e.g. several vehicles share identical patterns), the vehicle selection can then eventually be complemented/refined by using commonly used techniques based on active communication with the vehicle systems. This may be based on Requests/Responses using commands adapted in view of the partial identification already obtained and user manual selection and/or input.

Since passive listening is used, it is possible to start the vehicle identification process as soon as the vehicle communication interface is plugged on the OBD port of the vehicle without user action, so that when the user opens the diagnostic software user interface and message frames are extracted on the communication link, at least a preliminary identification can be provided.

If the communication pattern already corresponds to a unique vehicle in the first database, the right vehicle selection is instantaneously and automatically made.

In case of a vehicle does not provide sufficiently identifiable frames when its systems are asleep, the operator can be invited to realize additional actions such as ignition on or engine start to obtain a more complete frame pattern.

Figure 1:
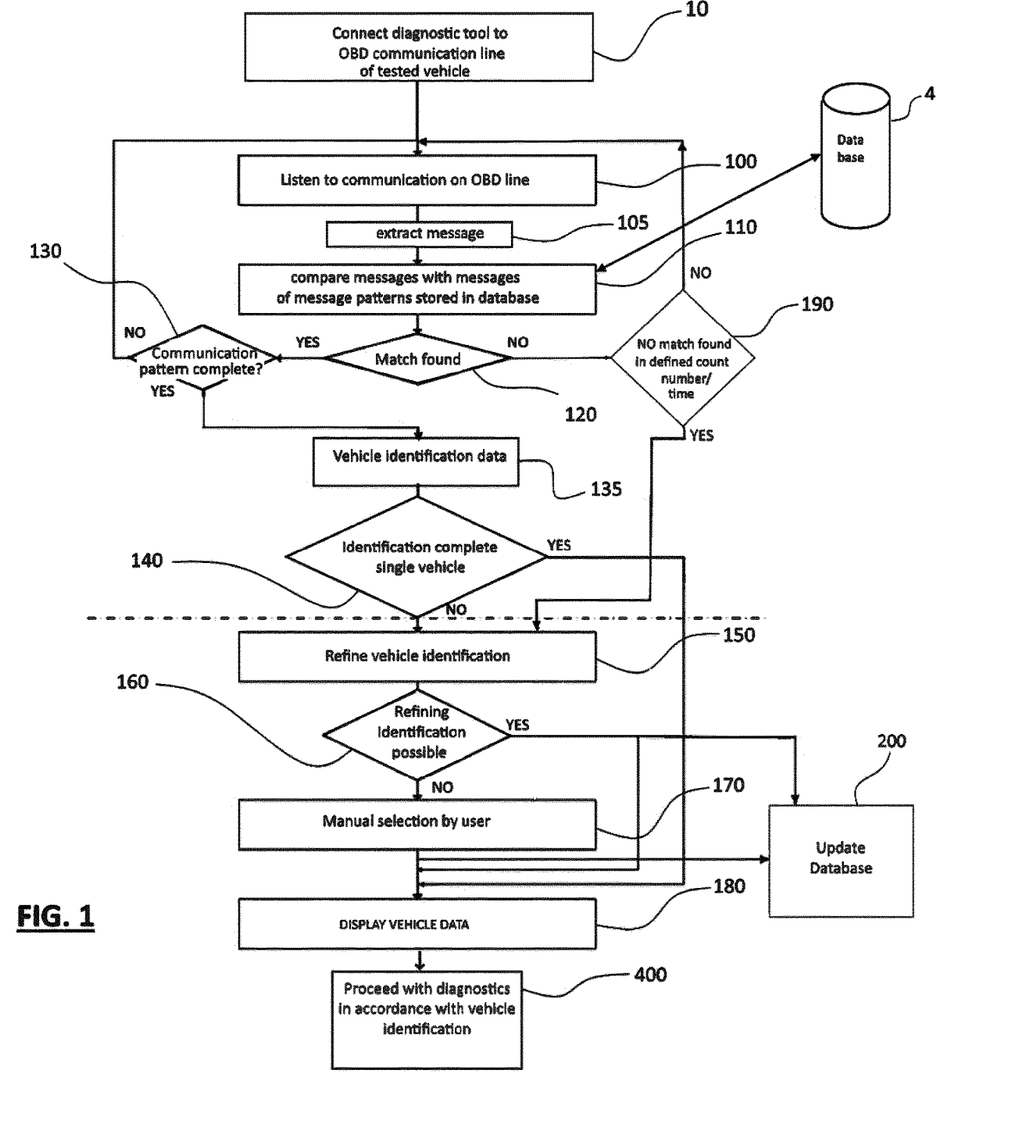
FIG. 1: is an exemplary flowchart of an identification method of the present disclosure.
Figure 6:
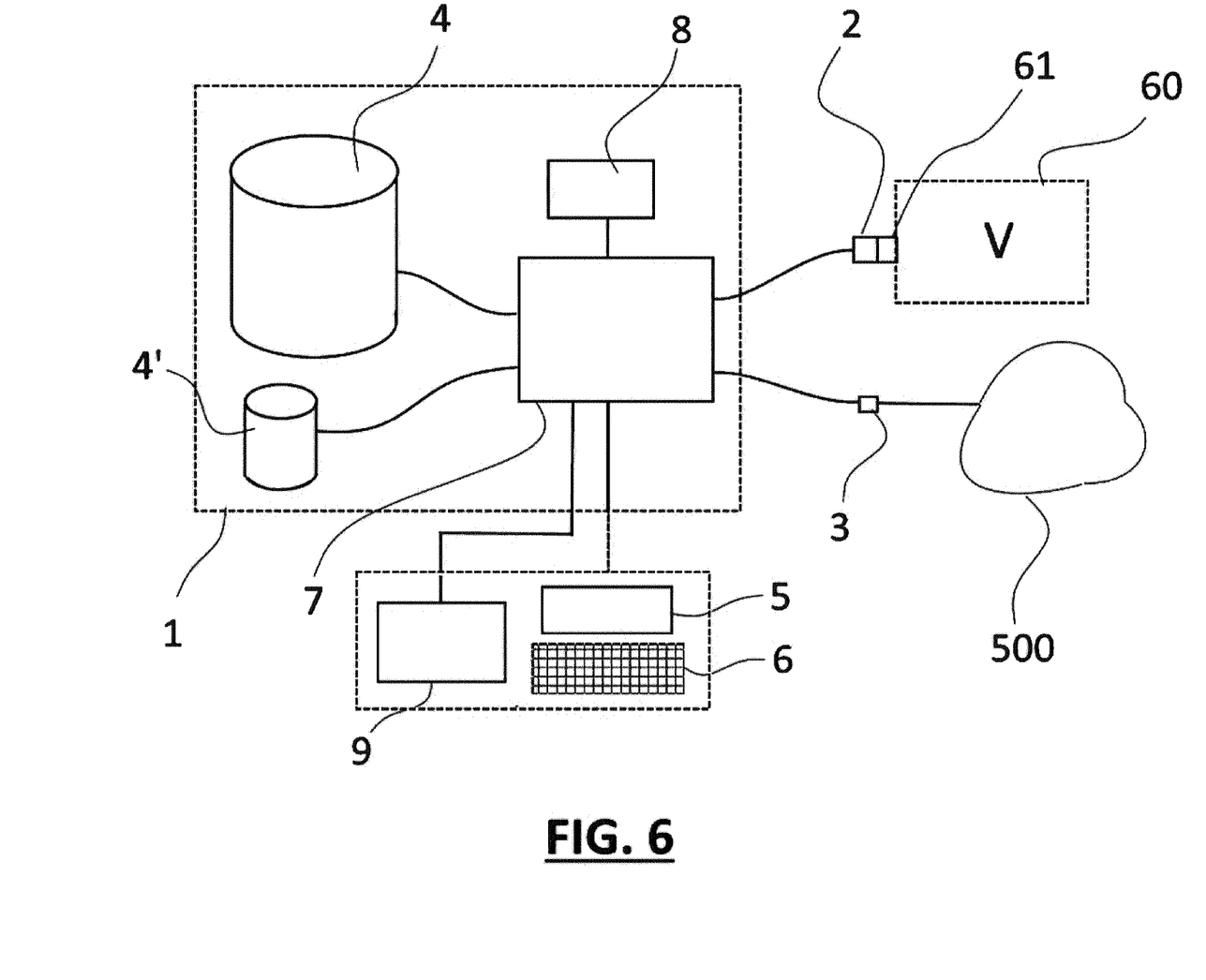
FIG. 6: is a schematic of a diagnostic tool according to the present disclosure.

In FIG. 1, the process then starts with 10 connecting the vehicle identification device 1 represented schematically in FIG. 6, having its vehicle communication interface 2, on the OBD plug 61 of a tested vehicle 60.

The tool then listens in step 100 of FIG. 1 to communication on the OBD bus to detect data frames, such as 40 in FIG. 3, emitted by or between systems of said tested vehicle on said at least one communication line, From these frames, the tool extracts in step 105 of FIG. 1 messages 41 of said tested vehicle from said data frames 40, The tool then compares in step 110 said messages of said tested vehicle with stored messages within stored communication patterns in said first database 4 which can be embedded in the tool or remote to identify messages of the vehicle corresponding to messages of said stored communication patterns. The tool then provides identification data 135 of the type/model and/or platform and/or brand of said tested vehicle when said messages of said vehicle are recognized as corresponding to a communication pattern of at least one of said vehicles and/or platforms and/or brands of vehicles.

This can be repeated e.g. with additional actions from the operator such as ignition on, engine start or other actions required by the vehicle identification device to detect other frames to refine identification.

If a match is found at test 120 but if the match doesn't allow accurate identification or is not complete at test 130, the sequence is repeated.

If no match is found at test 120 and no match is found in step 190 after a defined duration, a process of refining identification 150 may be initiated. Otherwise the sequence is repeated.

If the communication pattern is complete in test 130, then vehicle identification 135 is tested to check whether a single vehicle matches with a single vehicle first database pattern. If the identification of a single vehicle is not complete or is not possible at test 140, then the procedure of refining vehicle identification 150 is initiated.

This identification may use the VIN Vehicle Identification Number or a part thereof which provides the necessary information to determine the exact type of vehicle. It should be noted that serial number data in the VIN number may not be retrieved for confidential personal information protection.

Figure 2:
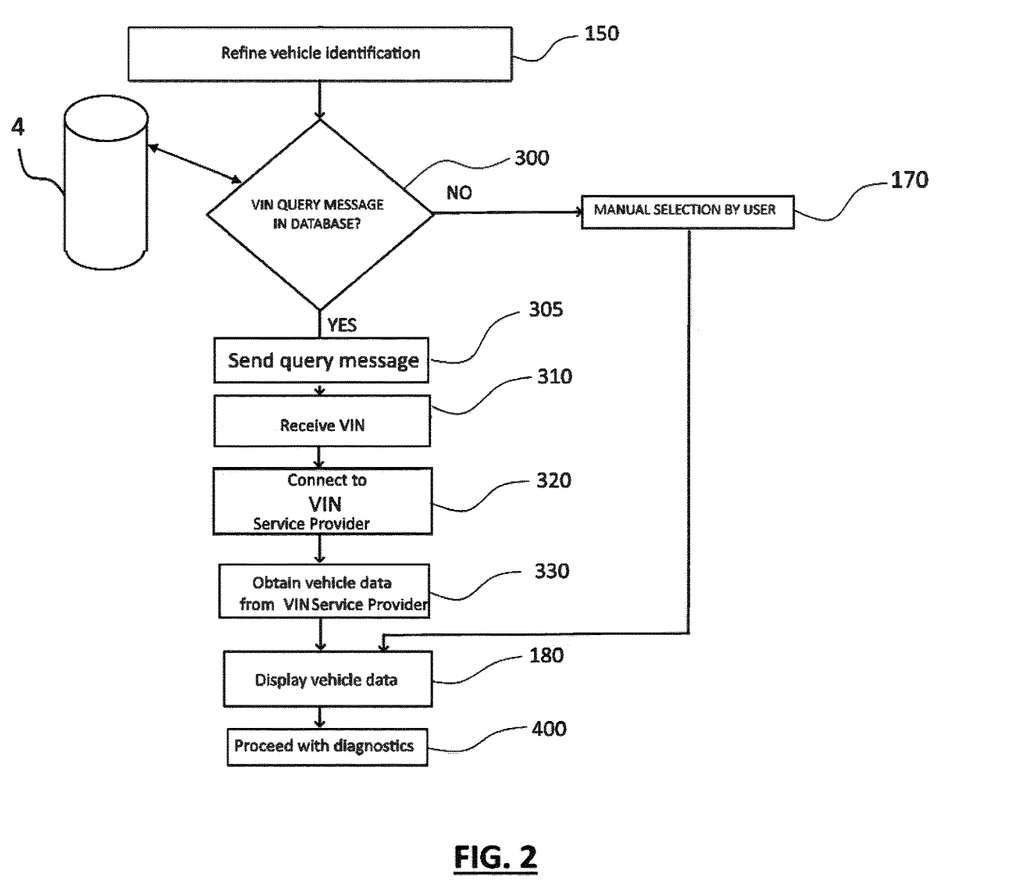
FIG. 2: is a detail of part of the flowchart of FIG. 1.

This procedure exemplified in FIG. 2 may comprise checking at 300 if a VIN query message can be found in the additional or second database 4'. If the VIN query message for the model or brand is found, the VIN query message is sent in step 305, the VIN is received and through a connection to a VIN decoding service which can be handled by an external VIN service provider 320 the vehicle information data is obtained 330 and displayed 180 on the tool to process diagnostics 400.

When the VIN decoding service is external, said vehicle identification device 1 comprising a communication port 3 to the internet 500 e.g. through radio telecommunication, such as GSM, 3G, 4G, 5G, or Wifi or wired, providing a complete identification of the model of the vehicle based on said VIN data can be done through connecting to an external provider which provides VIN description services and obtaining data from said external provider based on said VIN number.

If the VIN query cannot be found, manual selection of the vehicle 170 by the user is initiated.

Back to FIG. 1, when identification of a new vehicle is done, either with assisted or manual selection, the vehicle together with its extracted message communication pattern is introduced in the first database at step 200 to update said database and reference said new vehicle in said database.

The first database 4 may also comprise at least for some vehicles, vehicle data comprising vehicle VIN number 28 possibly without the vehicle serial number as discussed earlier, manufacturer group 24, brand 25, model, year 27. The process may then comprise displaying said VIN number 28, manufacturer group 24, brand 25, model, year 27 of an identified vehicle by said vehicle identification device if such is provided with a display or a tool embedding such.

When the vehicle identification device is used with a diagnostic tool or used within a diagnostic process, the first database may comprise further additional identification parameters such as aftersales cataloging vehicle identification number 29 or engine type number 30.

In such case a diagnostic process may use such additional identification parameters for diagnostic or repair purposes such as ordering repair parts.

The vehicle identification device 1 as exemplified in FIG. 6 is of a computer type comprising a vehicle communication interface 2, on at least one OBD plug, an internet communication port 3, storage means for the first database 4 and possibly a second database 4' of VIN queries and calculation means with a processor board 7, memory 8 including nonvolatile memory for storing programs including said process and volatile memory as found in computerized systems and comprises the necessary software for carrying out the process of the invention.

In case the vehicle identification device is part of a diagnostic tool such as workshop computerized diagnostic tool or a fleet management tool it may comprise a user interface such as screen 5 and keyboard 6 and a diagnostic or data treatment module 9.

The invention which was described hereabove mainly in the frame of providing diagnostics on a vehicle may also be used in a telematics device such as used in fleet management to record or transmit vehicle data to a remote server or other applications. The invention is not limited to the above description and in example, the device and process may comprise additional features related to vehicle diagnosis such as additional databases and diagnostic processes and the internet communication port may be of any type such as wired, WIFI, GSM or any other telecom radio protocols.

LIST OF REFERENCES

1—Vehicle identification device
2—communication interface
3—communication port
4—first database
5—screen
6—keyboard
7—processor board
8—memory
9—diagnostic module
21a, 21b—Hex ID
21,21a, 21b—length
22, 22a, 22b—periodicity
23, 23a, 23b—count
31—Data
40—data frames
41—message
50, 51—communication patterns
60—vehicle
61—OBD plug The inventio claimed is:

1. A process of identifying a model and/or platform and/or brand of a vehicle, comprising:
    connecting a vehicle identification device, having at least one vehicle communication interface, on at least one OBD plug of an OBD line of a tested vehicle, said vehicle identification device being associated with a first database of stored communication patterns corresponding to a list of models and/or platforms and/or brands of vehicles,
    listening to communication on OBD line to detect data frames emitted by or between systems of said tested vehicle on said at least one communication line,
    extracting messages of said tested vehicle from said data frames,
    comparing said messages of said tested vehicle with stored messages within stored communication patterns in said first database to identify messages of the vehicle corresponding to messages of said stored communication patterns and,
    providing identification data of model and/or platform and/or brand of said tested vehicle when said messages of said vehicle are recognized as corresponding to a communication pattern of at least one of said vehicles and/or platforms and/or brands of vehicles,
    wherein said steps of:
        listening to communication on OBD line to detect data frames emitted by or between systems of said tested vehicle on said at least one communication line,
        extracting messages of said tested vehicle from said data frames, and
        comparing said messages of said tested vehicle with stored messages within stored communication patterns in said first database to identify messages of the tested vehicle corresponding to messages of said communication patterns of vehicles within said stored communication patterns,
    are repeated to improve correspondence with said communication patterns in case match is found but the communication pattern is not complete.

2. The process according to claim 1, wherein in case no match is found between a specified number of extracted messages and messages in stored communication patterns, a process of refining vehicle identification is initiated.

3. The process according to claim 1, wherein in case no match is found after a specified duration of listening, extracting and comparing, a process of refining identification of the vehicle identification is initiated.

4. The process according to claim 2, comprising introducing said manual identification of the vehicle together with extracted message communication patterns in said first database to update said first database and reference said tested vehicle in said database in case identification is possible.

5. The process according to claim 1, wherein in case vehicle identification is not complete or several vehicles correspond to a single pattern then the procedure of refining vehicle identification is initiated.

6. The process according to claim 1, wherein said patterns comprise identified messages with identifier data, data length, periodicity, said comparing said message of said tested vehicle with stored messages within stored communication patterns in said first database comprises comparing at least said identifier data, data length, periodicity to identify messages of the tested vehicle.

7. The process according to claim 1, wherein said vehicle identification device comprises a second database comprising query messages for receiving VIN data associated with at least a group of models and/or platforms and/or brands of vehicles of said list and said vehicle identification device comprising means for emitting query messages on said OBD plug communication line, said process comprises emitting query messages for receiving VIN data for a partially identified vehicle of said group by said vehicle identification device and providing a complete identification of the model of the vehicle based on said VIN data.

8. The process according to claim 7, wherein said vehicle identification device comprising a communication port to the internet, said providing a complete identification of the model of the vehicle based on said VIN data comprises connecting to a VIN decoding service provider and obtaining data from said VIN decoding service provider based on said VIN number.

9. The process according to claim 1, wherein said first database comprises at least for some vehicles, vehicle data comprising vehicle VIN number, manufacturer group, brand, model, year, said process comprises displaying said VIN number, manufacturer group, brand, model, year of an identified vehicle by said vehicle identification device.

10. The process according to claim 9, wherein said first database comprises further other identification parameters such as aftersales cataloging vehicle identification number or engine type number, said process comprises using said identification parameters by said vehicle identification device to provide additional information for repairing the vehicle or ordering parts.

11. A vehicle identification device of a computerized type comprising a vehicle communication interface on at least one OBD plug of a vehicle, a communication port for a connection to the internet, storage means for said database, and calculation means configured to execute:
connecting a vehicle identification device, having at least one vehicle communication interface, on at least one OBD plug of an OBD line of a tested vehicle, said vehicle identification device being associated with a first database of stored communication patterns corresponding to a list of models and/or platforms and/or brands of vehicles,
listening to communication on OBD line to detect data frames emitted by or between systems of said tested vehicle on said at least one communication line,
extracting messages of said tested vehicle from said data frames,
comparing said messages of said tested vehicle with stored messages within stored communication patterns in said first database to identify messages of the vehicle corresponding to messages of said stored communication patterns and,
providing identification data of model and/or platform and/or brand of said tested vehicle when said messages of said vehicle are recognized as corresponding to a communication pattern of at least one of said vehicles and/or platforms and/or brands of vehicles,
wherein said steps of:
listening to communication on OBD line to detect data frames emitted by or between systems of said tested vehicle on said at least one communication line,
extracting messages of said tested vehicle from said data frames, and
comparing said messages of said tested vehicle with stored messages within stored communication patterns in said first database to identify messages of the tested vehicle corresponding to messages of said communication patterns of vehicles within said stored communication patterns,
are repeated to improve correspondence with said communication patterns in case match is found but the communication pattern is not complete.

12. A diagnostic tool comprising:
a vehicle identification device of a computerized type comprising a vehicle communication interface on at least one OBD plug of a vehicle, a communication port for a connection to the internet, storage means for said database, and calculation means configured to execute:
connecting a vehicle identification device, having at least one vehicle communication interface, on at least one OBD plug of an OBD line of a tested vehicle, said vehicle identification device being associated with a first database of stored communication patterns corresponding to a list of models and/or platforms and/or brands of vehicles,
listening to communication on OBD line to detect data frames emitted by or between systems of said tested vehicle on said at least one communication line,
extracting messages of said tested vehicle from said data frames,
comparing said messages of said tested vehicle with stored messages within stored communication patterns in said first database to identify messages of the vehicle corresponding to messages of said stored communication patterns and,
providing identification data of model and/or platform and/or brand of said tested vehicle when said messages of said vehicle are recognized as corresponding to a communication pattern of at least one of said vehicles and/or platforms and/or brands of vehicles,
wherein said steps of:
listening to communication on OBD line to detect data frames emitted by or between systems of said tested vehicle on said at least one communication line,
extracting messages of said tested vehicle from said data frames, and
comparing said messages of said tested vehicle with stored messages within stored communication patterns in said first database to identify messages of the tested vehicle corresponding to messages of said communication patterns of vehicles within said stored communication patterns,
are repeated to improve correspondence with said communication patterns in case match is found but the communication pattern is not complete;
the diagnostic tool comprising further a user interface and a diagnostic module for providing diagnostics on said vehicle.

13. A non-transitory computer readable medium storing a program causing a computer to execute:
connecting a vehicle identification device, having at least one vehicle communication interface, on at least one OBD plug of an OBD line of a tested vehicle, said vehicle identification device being associated with a first database of stored communication patterns corresponding to a list of models and/or platforms and/or brands of vehicles,
listening to communication on OBD line to detect data frames emitted by or between systems of said tested vehicle on said at least one communication line,
extracting messages of said tested vehicle from said data frames,
comparing said messages of said tested vehicle with stored messages within stored communication patterns in said first database to identify messages of the vehicle corresponding to messages of said stored communication patterns and,
providing identification data of model and/or platform and/or brand of said tested vehicle when said messages of said vehicle are recognized as corresponding to a communication pattern of at least one of said vehicles and/or platforms and/or brands of vehicles,
wherein said steps of:
listening to communication on OBD line to detect data frames emitted by or between systems of said tested vehicle on said at least one communication line,
extracting messages of said tested vehicle from said data frames, and
comparing said messages of said tested vehicle with stored messages within stored communication patterns in said first database to identify messages of the tested vehicle corresponding to messages of said communication patterns of vehicles within said stored communication patterns,
are repeated to improve correspondence with said communication patterns in case match is found but the communication pattern is not complete.

* * * * *